US006539639B2

(12) United States Patent
Smith

(10) Patent No.: US 6,539,639 B2
(45) Date of Patent: Apr. 1, 2003

(54) MONITORING ACCURACY OF AN ELECTRONIC COMPASS

(75) Inventor: Robert B. Smith, St. Anthony, MN (US)

(73) Assignee: Honeywell International Inc., Morristown, NJ (US)

(*) Notice: Subject to any disclaimer, the term of this patent is extended or adjusted under 35 U.S.C. 154(b) by 2 days.

(21) Appl. No.: 09/731,516

(22) Filed: Dec. 6, 2000

(65) Prior Publication Data

US 2002/0092188 A1 Jul. 18, 2002

(51) Int. Cl.[7] .......................... G01C 17/38; G01C 17/02
(52) U.S. Cl. ........................................ 33/356; 33/355 R
(58) Field of Search ...................... 33/356, 357, 355 R, 33/319, 326; 702/92, 150

(56) References Cited

U.S. PATENT DOCUMENTS

| 4,109,199 A | * | 8/1978 | Ball et al. ..................... 33/361 |
| 4,414,753 A |   | 11/1983 | Moulin et al. ................. 33/356 |
| 4,429,469 A | * | 2/1984 | Tsushima et al. ............. 33/356 |
| 4,539,760 A |   | 9/1985 | Marchent et al. ............. 33/356 |
| 4,593,359 A | * | 6/1986 | Sadeh .......................... 33/356 |
| 4,672,565 A |   | 6/1987 | Kuno et al. ................... 364/571 |
| 4,733,179 A | * | 3/1988 | Bauer et al. ................... 33/356 |
| 4,797,841 A |   | 1/1989 | Hatch ...................... 364/571.04 |
| 4,989,333 A | * | 2/1991 | Helldorfer et al. ............ 33/356 |
| 5,046,031 A | * | 9/1991 | Wanous ......................... 33/356 |
| 5,095,631 A | * | 3/1992 | Gavril et al. .................. 33/356 |
| 5,117,375 A |   | 5/1992 | Worcester et al. ....... 364/571.01 |
| 5,287,295 A | * | 2/1994 | Ives et al. ...................... 33/356 |
| 5,828,984 A |   | 10/1998 | Cage et al. .................... 702/92 |
| 5,946,813 A | * | 9/1999 | Nachbaur et al. ............. 33/357 |
| 6,009,629 A | * | 1/2000 | Gnepf et al. .................. 33/357 |

FOREIGN PATENT DOCUMENTS

| DE | 4124002 A1 | * | 1/1993 | ................. 33/356 |
| GB | 2158587 A | * | 11/1985 | ................. 33/356 |
| JP | 57127807 | * | 8/1982 | ................. 33/356 |
| JP | 62255814 A | * | 11/1987 | ................. 33/356 |
| JP | 03293517 A | * | 12/1991 | ................. 33/356 |
| JP | 04244913 A | * | 9/1992 | ................. 33/356 |
| JP | 05034156 A | * | 2/1993 | ................. 33/356 |

* cited by examiner

Primary Examiner—Diego Gutierrez
Assistant Examiner—Mirellys Jagan
(74) Attorney, Agent, or Firm—Honeywell International, Inc.

(57) ABSTRACT

A three-axis physical model is used to numerically compensate for errors in measured magnetic field values in an electronic compass for operation at any orientation. This compensation method generates certain quantities that characterize the magnetic field of the Earth in the vertical plane. These quantities are used to monitor the accuracy of the electronic compass during normal operation by comparing their current values either with values obtained during the calibration procedure or with values obtained from historical averages. Significant departure from the calibration values or from the historical averages indicates a probable loss of accuracy of the compass, and the user is so alerted.

18 Claims, 8 Drawing Sheets

MONITORING ACCURACY OF AN ELECTRONIC COMPASS

STATEMENT OF GOVERNMENT INTEREST

This invention was made with Government Support under contract number DAAK 60-94-C-1065:XXQ-447. The Government has certain rights in the invention.

FIELD OF THE INVENTION

The present invention relates to electronic compasses. More particularly, the present invention relates to compensation of electronic compasses for magnetic errors.

BACKGROUND

Electronic compasses are well known in the art. Such devices typically have used magnetic flux gate or other sensors to measure magnetic fields and to determine orientation with respect to the Earth's magnetic field. As with needle- or card-based compasses, however, when an electronic compass is used in an environment of ferrous metals and associated perturbing fields, the fields sensed by the magnetometer sensors are incorrect, leading to erroneous readings of Earth's magnetic field and compass azimuth.

To obtain correct readings, it is necessary to compensate for these magnetic perturbations. Compensating needle- or card-based compasses requires the use of bar magnets and/or soft iron masses to physically neutralize and cancel perturbing magnetic fields. These magnets and soft iron masses must be positioned carefully about the compass so as to cancel preexisting perturbations and reduce deviation errors to, for example, 3–5°. Even after this reduction, however, residual deviation errors must be plotted against true azimuth so that the user can correct the azimuth value.

Electronic compasses, which use microprocessors to process the data received from the magnetometer sensors, can be compensated using numerical methods. One particular example of compensation using numerical methods is the classical five-term compensation formula for a level compass. In this formula, the deviation of the azimuth as measured by the compass from the true heading is expressed in degrees as a function of the true magnetic azimuth $\theta$ as follows:

$$\text{Deviation} = A + B \cdot \sin(\theta) + C \cdot \cos(\theta) + D \cdot \sin(2\theta) + E \cdot \cos(2\theta)$$

where A, B, C, D, and E are coefficients whose values are determined through some calibration procedure. This compensation technique exhibits certain limitations. For example, the above formula is only an approximate expression, valid only for small deviations and small values of A, B, C, D, and E. Thus, this technique is only used after physical compensation to reduce deviation errors, e.g., through the addition of magnets and/or soft iron masses. In addition, the formula is valid only for a level compass and is therefore poorly suited for use in environments in which the orientation of the compass may vary widely within three-dimensional space, such as heeled ships. Changes in latitude can also affect the quality of compensation. While this compensation technique is reasonable for use also with aircraft flux gate compasses, it is only approximate for pendulous flux gate compasses, as the coefficients are dependent on tilt attitude and magnetic latitude.

Certain conventional compensation techniques have been implemented, but many are limited to two-axis compasses and do not produce adequate results for a variety of arbitrary orientations of the compass in three-dimensional space.

Some conventional compensation techniques have been applied to three-axis compasses. Such conventional techniques, however, fail to adequately compensate for certain types of errors because they rely on symmetric coefficient matrices.

Even after an electronic compass is compensated, certain conditions can cause the compass to lose accuracy. For example, changes in the compass or its installation, e.g., resulting from changes in the mounting of the compass with respect to the vehicle or equipment, shifts of a portion of magnetic material, or changes in magnetization of the vehicle material, can cause the internal magnetic perturbing fields to change and the magnetic compensation to become incorrect. In addition, external magnetic anomolies in the environment, such as magnetic geological formations or man-made structures, e.g., buildings or vehicles, can cause the magnetic field to become misaligned with respect to magnetic north. In this case, the compass is not accurate, even though its calibration remains valid.

Thus, both internal and external conditions can cause an electronic compass to lose accuracy even after it has been compensated. A need continues to exist to detect these conditions so that the user can recalibrate the compass or, at least, be made aware that compass readings may not be accurate.

SUMMARY OF THE INVENTION

To correct magnetic error conditions, a compensation technique is employed that mathematically corrects the measured magnetometer signals for magnetic anomalies. This technique also generates certain magnetic field values that are not used in the compensation formula, but that are used to monitor the accuracy of the electronic compass.

According to one embodiment, the present invention is directed to a method for monitoring the accuracy of an electronic compass. During calibration of the electronic compass, numerical compensation coefficients are calculated using a technique that also yields certain magnetic field values that characterize the magnetic field of the Earth during calibration. During normal operation of the electronic compass, compensated field values are subsequently used to calculate the compass magnetic azimuth. Also generated from this calculation are similar values that characterize the magnetic field of the Earth during normal operation. These values are compared with the values obtained during calibration.

In another embodiment, these characteristic values obtained during normal operation are instead compared to historical averages rather than to values obtained during calibration. This allows the accuracy to be monitored without knowledge of the values obtained during calibration.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

These and other aspects and advantages of the present invention will become apparent upon reading the following detailed description and upon reference to the drawings, in which.

Figure 1:
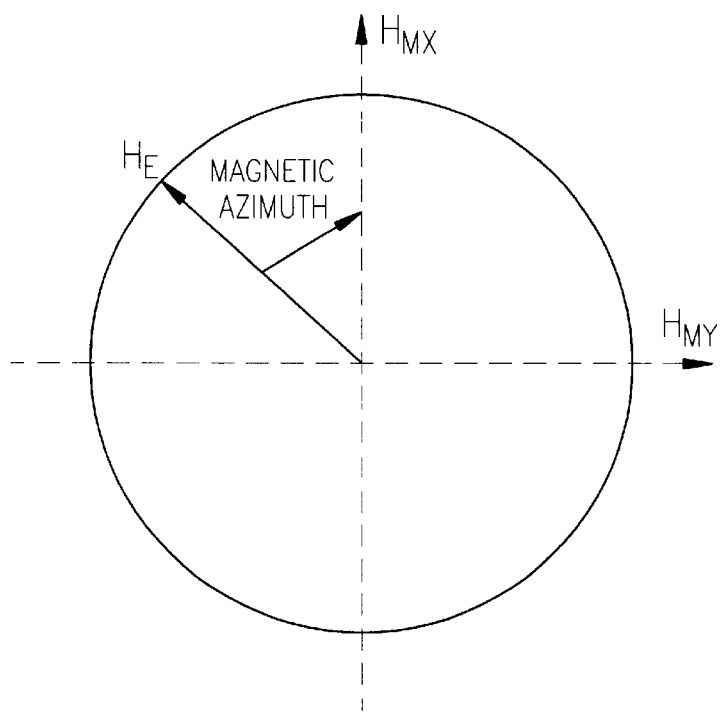
FIG. 1 illustrates the locus of the Earth's measured magnetic field without perturbations.

The invention is amenable to various modifications and alternative forms. Specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to electronic compasses. The invention is particularly advantageous for use in electronic compasses that are susceptible to environmental conditions that potentially cause them to lose accuracy. An appreciation of various aspects of the invention can be gained through a discussion of various application examples operating in such environments.

According to one example embodiment of the present invention, an electronic compass is based on a three-axis electronic magnetometer fixed with respect to a vehicle or other equipment on which it is installed. Three-axis accelerometers or tilt sensors measure the direction of gravity for calculating the local level plane in which the compass azimuth or heading is determined. A computer microprocessor uses the numerical values obtained for the measured magnetic fields and measured gravity direction to calculate the magnetic azimuth of the axis of the compass regardless of its orientation. As a result, the compass can operate in any orientation and does not need to be held level.

Underlying Principles.

As previously discussed, the measured magnetic fields are susceptible to errors caused by, for example, ferrous metals in the operating environment. These errors are attributable to additive magnetic perturbations, which cause azimuth deviation errors. Because of these perturbations, the measured magnetic field $H_{MEAS}$ differs from the Earth's magnetic field $H_{EARTH}$ as follows:

$$H_{MEAS} = H_{EARTH} + H_{INDUCED} + H_{PERM}$$

where $H_{INDUCED}$ represents the induced magnetic field perturbation, and $H_{PERM}$ represents the permanent magnetic field perturbation.

Figure 2:
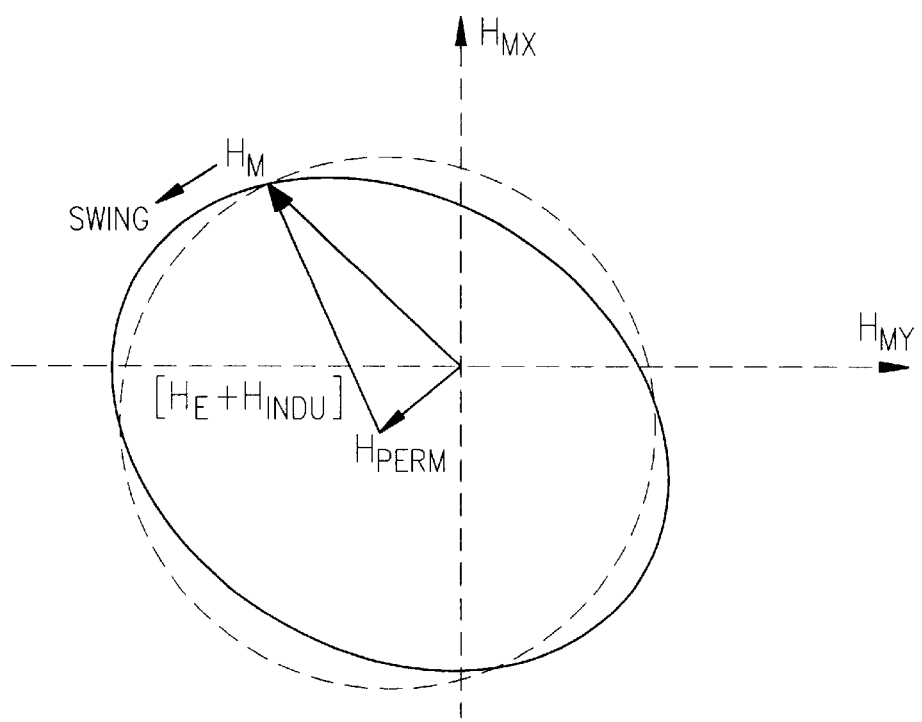
FIG. 2 illustrates combined effects of both permanent and induced field magnetic perturbations on the locus of a magnetic field as measured by a magnetometer.

The effect of perturbations on the measured field can be seen in FIGS. 1–2. FIG. 1 illustrates the locus of the Earth's magnetic field without perturbations, assuming a level compass and 360 degree compass swing. As can be seen in FIG. 1, the locus is a circle, with azimuth defined clockwise from magnetic north. $H_{EARTH}$ rotates counterclockwise with compass swing, and the vertical magnetic field component $H_Z$ is constant.

FIG. 2 illustrates combined effects of $H_{PERM}$ and $H_{INDUCED}$, which cause the locus to be off-centered and elliptical, respectively. Thus, the locus is an off-centered ellipse that can have any orientation. Further, points may be rotated along the ellipse. If $H_{PERM}$ is larger than $H_{EARTH}$, then $H_{MEAS}$ does not do a full swing, resulting in 180 degree error at some point. In addition, $H_{INDUCED}$ perturbations can cause $H_{MEAS}$ to be characterized by a constant deviation error at all azimuths and to be incorrect at all orientations.

The permanent-field perturbation $H_{PERM}$ results from permanent magnetization and DC currents in any part of the compass and its installation. As a result, in the compass case, $H_{PERM}$ is fixed and constant relative to the compass and the installation. Because $H_{EARTH}$ varies with orientation, the orientation of $H_{PERM}$ relative to $H_{EARTH}$ changes with the orientation of the compass. $H_{PERM}$ causes zero offsets in measured fields for all three axes, which result in azimuth deviation errors. These errors vary with azimuth and tilt orientation.

The induced-field perturbation, $H_{INDUCED}$, is attributable to soft iron material in the environment in which the compass operates. $H_{INDUCED}$ is variable in both magnitude and direction and is proportional to $H_{EARTH}$ and may be written as:

$$H_{INDUCED} = K \cdot H_{EARTH},$$

The induced magnetic field perturbation vector $H_{INDUCED}$ can always be resolved into three linearly independent contributions, such that $$H_{INDUCED} = H_1(H_{EARTH}) + H_2(H_{EARTH}) + H_3(H_{EARTH}) = K \cdot H_{EARTH},$$

where K is a 3×3 magnetic susceptibility matrix that characterizes $H_{INDUCED}$ as a function of $H_{EARTH}$. The directions of $H_1$, $H_2$, and $H_3$, the three field contributions at the sensors, are fixed and orthogonal to each other and do not depend on the direction of the Earth's magnetic field, $H_{EARTH}$. When any of these contributions reaches a maximum positive or negative value with changing orientation of $H_{EARTH}$, the other two contributions are zero.

The orientation of the field $H_{EARTH}$ itself has three particular orthogonal directions, denoted as $e_1$, $e_2$, and $e_3$, for which the respective contribution of each will reach a maximum magnitude in either a positive direction or a negative direction. These maximum magnitudes will have distinct values, denoted as $k_1$, $k_2$, and $k_3$. The two orthogonal triads, corresponding to $H_{INDUCED}$ and $H_{EARTH}$, are independent from each other. The triads and the maximum magnitudes can both be deduced using the magnetic susceptibility matrix K using a technique known as singular value decomposition, or SVD.

K can be factored into three SVD matrix factors as follows:

$$K \equiv [h_1 \mid h_2 \mid h_3] \cdot \begin{bmatrix} k_1 & 0 & 0 \\ 0 & k_2 & 0 \\ 0 & 0 & k_3 \end{bmatrix} \cdot \begin{bmatrix} e_1 \\ e_2 \\ e_3 \end{bmatrix}$$

where $h_1$, $h_2$, and $h_3$ are unit column vectors corresponding to induced field directions at the sensors, $k_1$, $k_2$, and $k_3$ are the peak magnitudes of each contribution, and $e_1$, $e_2$, and $e_3$ are unit row vectors corresponding to the orthogonal directions for the Earth's magnetic field $H_{EARTH}$. A three-term Dyadic representation of K may be derived as a sum of three matrices obtained from the column vectors h> and the row vectors <e, acting from the left on $H_{EARTH}$:

$$K = h_1 > k_1 < e_1 + h_2 > k_2 < e_2 + h_3 k_3 < e_3 = K_1 + K_2 + K_3$$

When K acts on $H_{EARTH}$, the above relation becomes:

$$K \cdot H_{EARTH} = h_1 > k_1 < e_1 \cdot H_{EARTH} > + h_2 < k_2 < e_2 \cdot H_{EARTH} > + h_3 > k_3 < e_3 \cdot H_{EARTH} >,$$

where $h_1 > k_1 < e_1 \cdot H_{EARTH} > = H_1(H_{EARTH})$, $h_2 > k_2 < e_2 \cdot H_{EARTH} > = H_2(H_{EARTH})$, and $h_3 > k_3 < e_3 \cdot H_{EARTH} > = H_3(H_{EARTH})$. For any value of K, the numerical singular value decomposition of K will yield numerical values for these representations and the separate geometric contributions to $H_{INDUCED}$ and $H_{EARTH}$. The matrix K is typically relatively small.

Because, in the measured field $H_{MEAS}$ expression, $H_{EARTH}$ and $K \cdot H_{EARTH}$ always appear added, a magnetic permeability matrix M can be used to simplify calculations, where M is related to K as follows:

$$M = (I_3 + K)$$

Thus, $$(H_{EARTH} + K \cdot H_{EARTH}) = (I_3 + K) \cdot H_{EARTH} = M \cdot H_{EARTH}$$

Considering both induced field perturbation and permanent field perturbation, the field $H_{MEAS}$ as measured by the magnetometer can be expressed using the formula:

$$H_{MEAS} = M \cdot H_{EARTH} + H_{PERM}$$

where M is the magnetic permeability matrix, as previously discussed. Any uncompensated compass can be fully characterized by determining the values of the matrix M and the vector $H_{PERM}$. This relation accounts for almost all forms of magnetic error associated with a compass, except for factors related to the instability of parameters, such as thermal and hysteresis considerations, shifting loads, and equipment errors.

Example Embodiments.

To determine the Earth's magnetic field $H_{EARTH}$ from the measured magnetic field $H_{MEAS}$, any of a variety of numerical methods can be employed to compensate for the magnetic errors. Some specific methods that are particularly advantageous are described in detail in co-pending U.S. patent application Ser. No. 09/731,177, filed Dec. 6, 2000 and assigned to the instant assignee, the disclosure of which is hereby fully incorporated by reference. These methods employ a compensation formula that mathematically corrects the measured magnetometer signals for magnetic errors, after which the compass azimuth is accurately calculated. A calibration process determines certain numerical coefficients used in the compensation formula. In one embodiment of the present invention, the calibration process also generates certain additional numerical coefficients that are not used in the compensation formula, but that are used to monitor the accuracy of the electronic compass.

Figure 3:
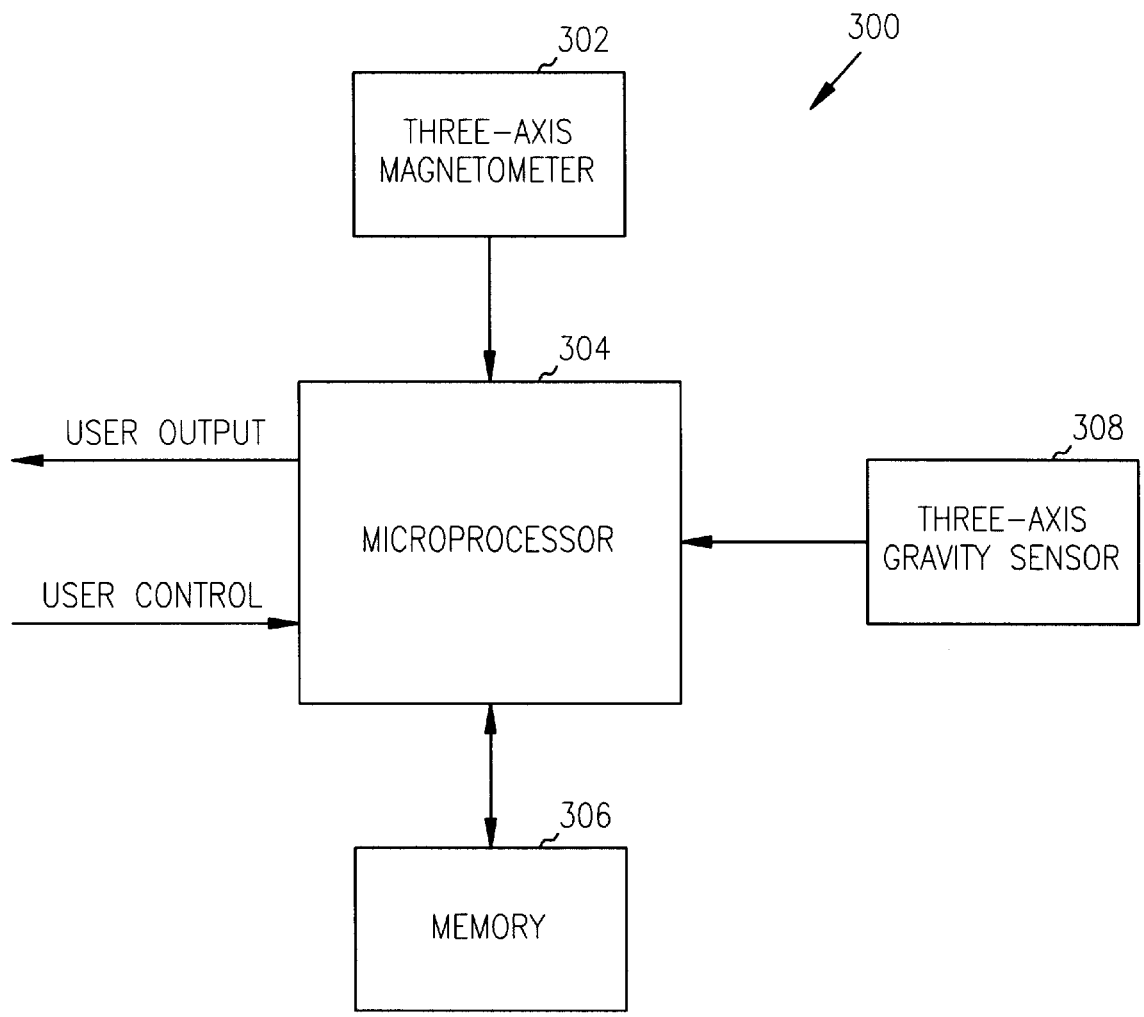
FIG. 3 is a block diagram illustrating an example compensated electronic compass, according to a particular embodiment of the present invention.
Figure 4:
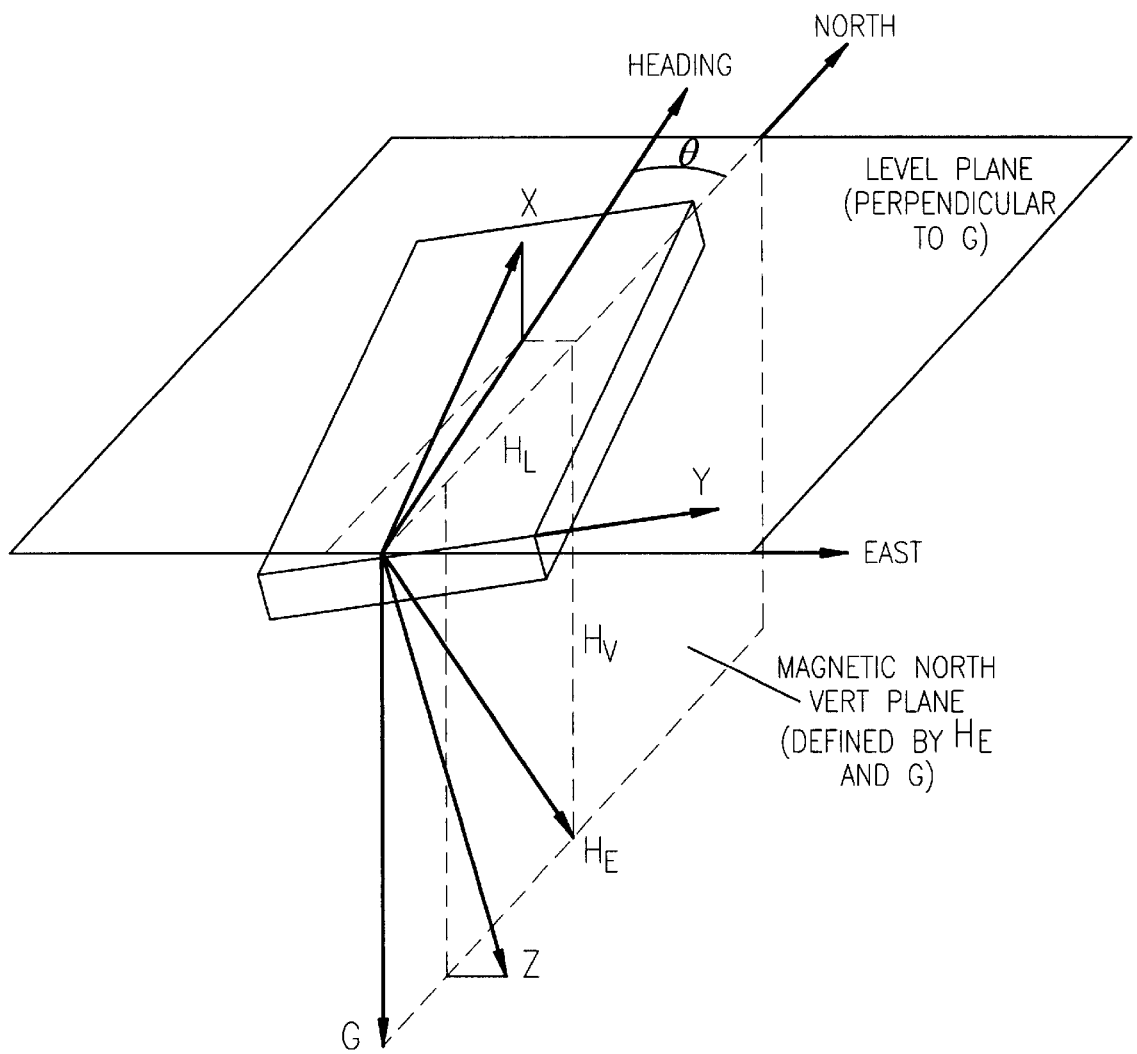
FIG. 4 depicts the coordinate systems associated with the compass of FIG. 3.

FIG. 3 is a block diagram illustrating an example compensated electronic compass 300, according to a particular embodiment of the present invention. The compass 300 includes a three-axis magnetometer 302 that is fixed with respect to the vehicle or other equipment on which it is installed. The magnetometer 302 measures the magnetic field with respect to a three-axis internal coordinate system as depicted in FIG. 4. In FIG. 4, the compass' internal coordinate system is denoted by x-, y-, and z-axes, and is depicted relative to the Earth level plane perpendicular to the gravity vector G. Usually, but not necessarily, the z-axis of the internal coordinate system is the downward direction relative to the equipment to which the compass is attached. The y-axis is perpendicular to the z-axis and extends to the right, and the x-axis is perpendicular to the y- and z-axes and is generally defined as the "forward" direction for the compass and the equipment. The x-axis is of particular interest; its orientation relative to Earth's magnetic north is used to define the azimuth. Specifically, the angle measured from the north direction to the x-axis direction defines the azimuth; this angle lies in the horizontal level plane. If the compass is not level, but is rather at a significant pitch and/or roll angle, then the azimuth is defined by the projection of the x-axis onto the horizontal level plane. Thus, the magnetic azimuth of interest is the angle measured from the level component of the Earth's magnetic field to the level component of the x-axis of the compass' internal coordinate system. This angle is positive when measured clockwise from the north direction.

The magnetometer 302 provides magnetic sensor data to a microprocessor 304, which performs all calculations. The microprocessor 304 stores the compensation data it generates in a memory 306, from which it retrieves data for use in compensating subsequently measured magnetometer data for magnetic errors. A gravity sensor 308 provides the microprocessor 304 with information as to the orientation of the electronic compass 300. This orientation data is used, along with the magnetometer data, to calibrate the electronic compass 300. The gravity sensor 308 can be implemented using, for example, a three-axis accelerometer or tilt sensors. As an alternative, the orientation data can be obtained using external information. For example, if the compass 300 is mounted on an airplane, the airplane's flight control or navigation system can be used to provide the orientation data, thus avoiding the need for a dedicated gravity sensor. After the electronic compass 300 has been calibrated, the compensation data is used to compensate magnetometer data for magnetic errors, thereby enabling accurate calculation of magnetic azimuth.

Figure 5:
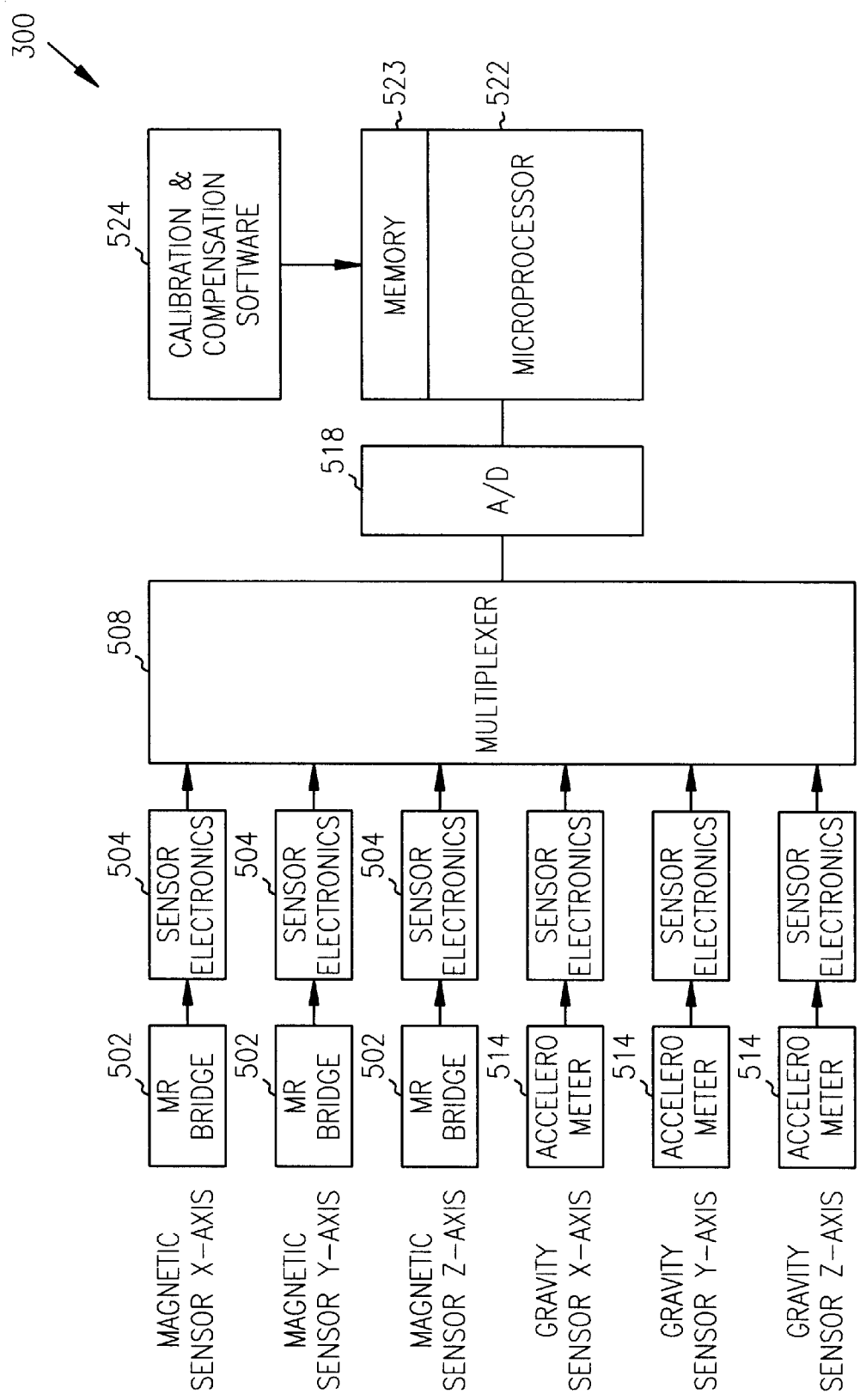
FIG. 5 is a block diagram illustrating a particular embodiment of the electronic compass of FIG. 3, according to another embodiment of the present invention.

FIG. 5 illustrates a particular implementation of the electronic compass 300 depicted more generally in FIG. 3. Magnetic sensors 502 formed by magnetoresistive (MR) bridges obtain magnetic field measurements with respect to each of three coordinate axes of an internal coordinate system, such as the coordinate system depicted in FIG. 4. MR bridges are particularly suitable for implementing the magnetic sensors 502 due to their small size and low power requirements. The magnetic sensors 502 are fixed with respect to the vehicle or equipment on which the electronic compass 300 is mounted. The measurements are provided to sensor electronics modules 504, which may also be implemented, for example, using other conventional types of sensor electronics that are well-known in the art. The outputs of the sensor electronics modules 504 are provided to a multiplexer 508, which samples each in turn.

In the particular implementation depicted in FIG. 5, the multiplexer 508 also receives acceleration information from accelerometers 514. These accelerometers 514 measure acceleration and gravity along each of the three axes of the internal coordinate system of the electronic compass.

The multiplexer 508 provides the magnetic sensor and accelerometer signals to an analog-to-digital (A/D) converter 518, which converts the signals in turn to digital data and provides the converted data to a microprocessor arrangement 520 having a microprocessor 522 and a memory 523. The microprocessor arrangement 520 uses this information to compute the azimuth angle. Due to magnetic errors, however, if not compensated, the azimuth will typically not be correct.

To correct the measured magnetic fields, the microprocessor 522 processes the data in a manner directed by software 524 loaded in the memory 523 associated with the microprocessor 522. This software 524 implements the routines for calibrating the electronic compass 300, performing magnetic compensation once the magnetic compass 300 has been calibrated, and calculating the magnetic azimuth after performing the magnetic compensation. As a result of the compensation process, the microprocessor 522 calculates the azimuth angle, which is output to the user via, for example, a conventional RS-232 data interface.

As described above, the specific methods that are described in co-pending U.S. patent application Ser. No. 09/731,177 employ a compensation formula that mathematically corrects the measured magnetometer signals for magnetic perturbations, after which the compass azimuth is accurately calculated. A calibration process determines certain numerical coefficients used in the compensation formula. This calibration process also generates certain additional numerical values that are not used in the compensation formula, namely, values for the vertical and level components of the Earth's magnetic field. According to an embodiment of the present invention, these values are used to monitor the accuracy of the electronic compass.

Using these values, the azimuth accuracy of an electronic compass can be monitored without points of known azimuth or other external information. If the current azimuth values are determined thereby to be inaccurate and unreliable, a warning is issued to the user. Several different causes of inaccuracy can be detected, such as changes in internal magnetic perturbing fields that require recalibration of the compass. External magnetic anomalies in the operational environment can also be detected. In this case, while the compass azimuth is not accurate, compass calibration remains valid. According to one implementation, the user is warned to move away from the area if compass accuracy is desired, but the compass need not be recalibrated.

Figure 6A:
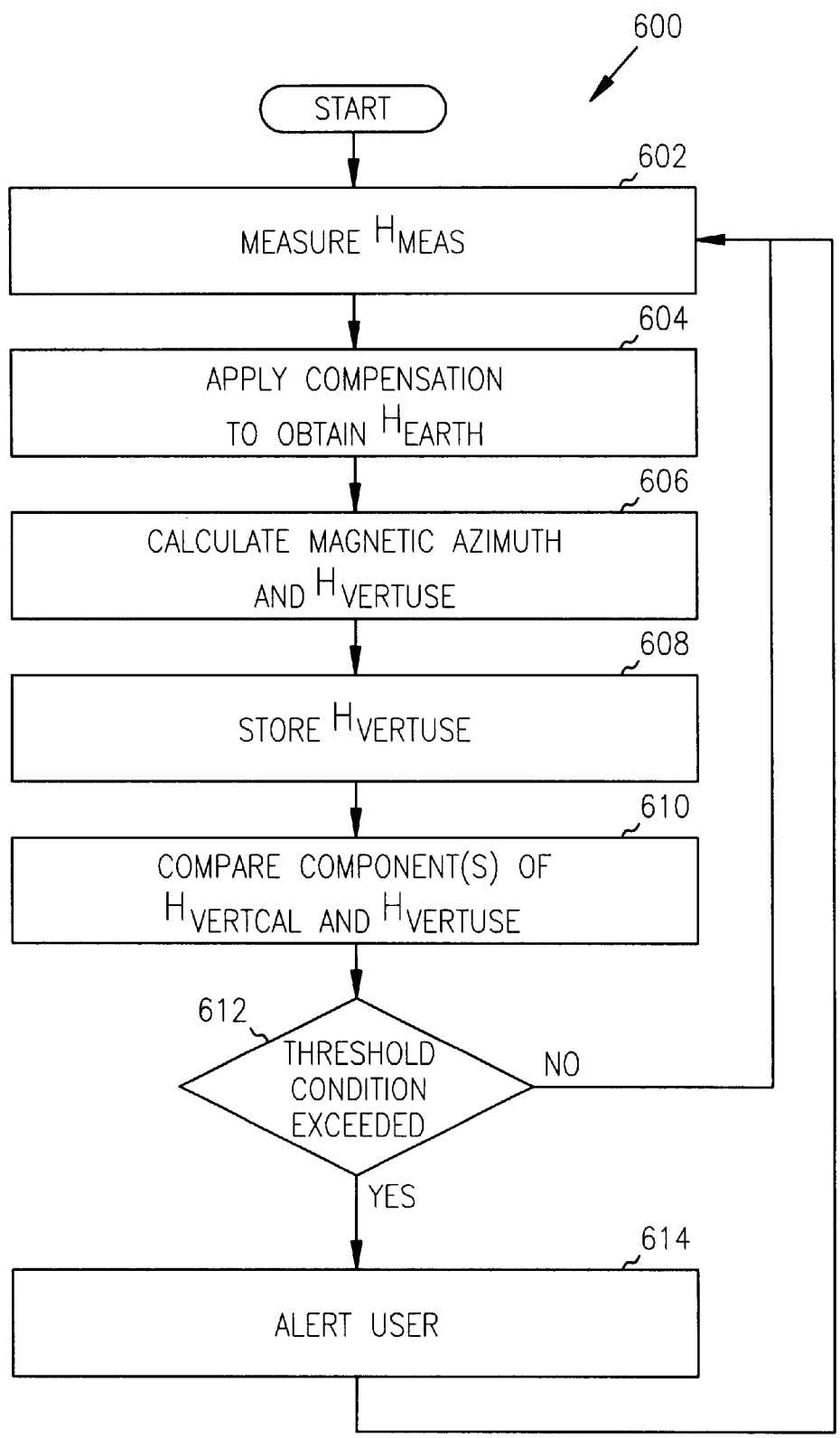
FIGS. 6A and 6B illustrate an example method for monitoring the accuracy of an electronic compass, according to still another embodiment of the present invention.
Figure 6B:
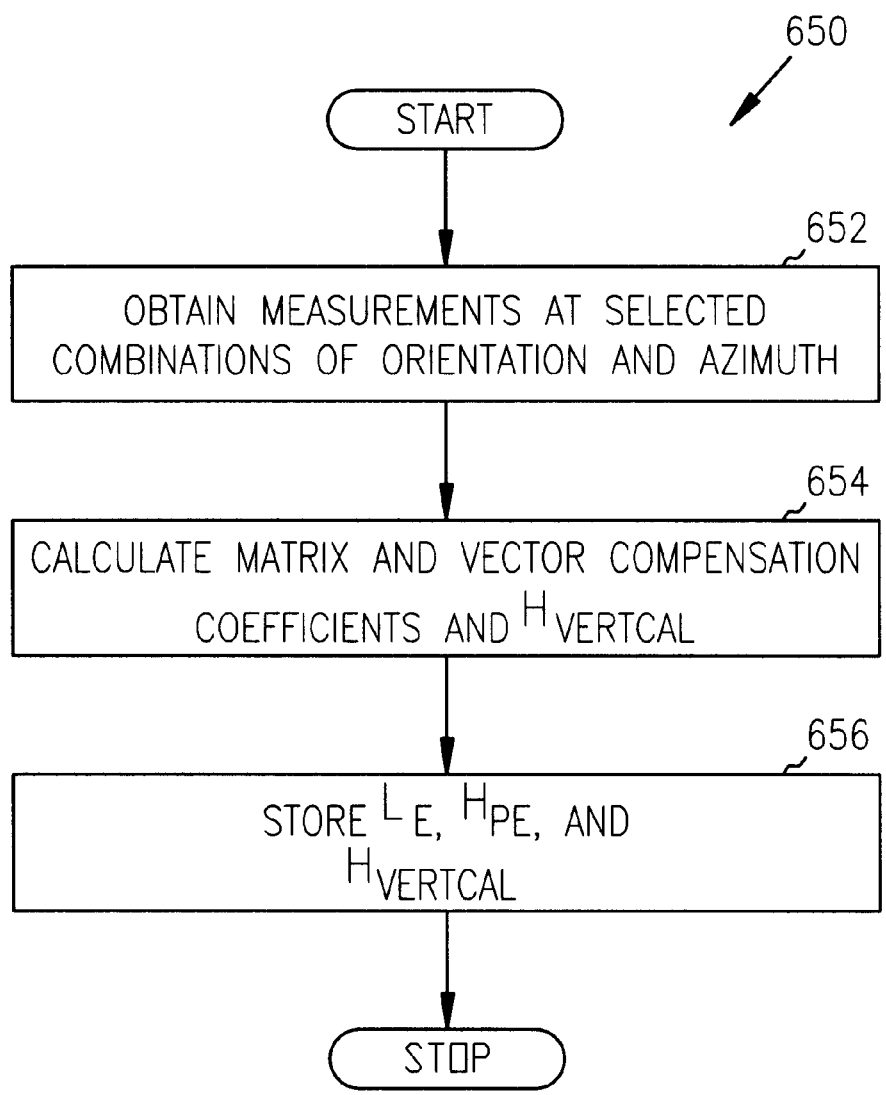

FIGS. 6A and 6B illustrate an example method for monitoring the accuracy of the electronic compass 300, according to another embodiment of the present invention. FIG. 6A depicts a process 600 performed during normal operations of the electronic compass 300. Compensation is performed during normal operations of the electronic compass. First, starting at a block 602, a three-axis magnetic field vector $H_{MEAS}$ is measured. Next, at a block 604, the compensation formula $$\hat{H}_{EARTH} = L_E \cdot H_{MEAS} - H_{PE}$$

is applied using the values of the matrix coefficient $L_E$ and the vector coefficient $H_{PE}$ as determined during a calibration procedure described below in connection with FIG. 6B. Applying the compensation formula corrects the magnetometer data for magnetic errors. Based on the corrected magnetometer data, the magnetic azimuth is then calculated at a block 606. This calculation also yields a set of two magnetic field values, described more fully below in connection with FIG. 7, that together form a vector $H_{VertUse}$ that is used to monitor the accuracy of the electronic compass 300, according to the present invention. At a block 608, the vector $H_{VertUse}$ is stored in a memory associated with the electronic compass 300.

Next, at a block 610, the components of the vector $H_{VertUse}$ are compared with the components of a similar vector $H_{VertCal}$ that is calculated in connection with calibrating the electronic compass 300, as described below in connection with FIG. 6B. At a decision block 612, it is determined whether the difference between the vectors $H_{VertUse}$ and $H_{VertCal}$ exceeds a threshold value. If not, flow returns to block 602, and the process repeats. If, however, the threshold condition is exceeded, the user is alerted at a block 614. The user can then move to another location, recalibrate the electronic compass, or simply ignore the alert. In any case, after the user has handled the alert, normal operation resumes at block 602.

Before the electronic compass 300 can be compensated, it must be calibrated. Calibration involves determining the values of the matrix coefficient $L_E$ and the vector coefficient $H_{PE}$ to be applied in the compensation formula $$\hat{H}_{EARTH} = L_E \cdot H_{MEAS} - H_{PE}$$

and is typically only performed occasionally. FIG. 6B depicts a calibration procedure 650 that is performed only occasionally, e.g., when the user receives an alert that the azimuth is not accurate. First, at a block 652, the electronic compass 300 is calibrated by measuring a three-axis magnetic field vector $H_{MEAS}$ and a three-axis gravity vector $G_{MEAS}$ at each of a number of combinations of tilt orientations and azimuths as described in co-pending U.S. patent application Ser. No. 09/731,177.

Next, using the set of sixteen measurements thus obtained, i.e., the three-element vector $H_{MEAS}$ and the three-element vector $G_{MEAS}$ for each of the sixteen combinations of pitch and roll angles, a set of equations is then formulated and solved to determine $L_E$ and $H_{PE}$, as depicted at a block 654. The particular method of determining $L_E$ and $H_{PE}$ is discussed more fully in co-pending U.S. patent application Ser. No. 09/731,177. This process generates, in addition to $L_E$ and $H_{PE}$, two other values that represent the Earth's magnetic field in the vertical plane at the place and time the calibration procedure was performed. Together, these values form a two-element magnetic vector quantity denoted as:

$$H_{Vert} = [H_{Gravity}, H_{Level}] = [H_G, H_L]$$

This magnetic vector contains the magnetic field components in the gravity or vertical direction and in the level or North direction. Values for $H_G$ and $H_L$ are obtained as a part of the calculations involved in determining $L_E$ and $H_{PE}$, and are stored in memory even though they are not otherwise used in the compensation formula. It has been observed that $H_G$ and $H_L$ are determined even more accurately than the other compensation coefficients.

More specifically, to calculate the compass magnetic azimuth, the corrected Earth-field vector $H_{EARTH}$ is rotated into an Earth-level frame of reference during the course of calculating the compass magnetic azimuth, as discussed more fully below. Values for the local vertical and horizontal components of the Earth's magnetic field are a natural result of this operation and are, according to a particular embodiment of the present invention, used to monitor the accuracy of the compass.

A 3×3 rotation matrix C is used to rotate the corrected Earth-field vector $H_{EARTH}$ into its Earth frame components. This matrix is calculated based on a gravity vector $G_{MEAS}$, which is measured by the acclerometers or tilt sensors in the coordinate system of the compass. One of the components of the corrected Earth-field vector $H_{EARTH}$, namely $H_G$, is vertical in the direction of gravity. Another component, $H_X$, is level and in the "forward" direction of the compass. The third, $H_Y$, is also level and is perpendicular to $H_G$ and $H_X$. These three values represent the Earth's magnetic field along directions that are fixed with respect to the Earth. Because the compass can be oriented in any direction, these three vector components are not along the axes of the compass. Specifically, $H_X$ and $H_Y$ are not coincident with the x- and y-axes of the compass case. It should be noted that, although the forward axis of the electronic compass can be pitched or tilted either up or down, the azimuth of the compass is defined by the projection of its x-axis on the horizontal plane, and the roll tilt angle is not relevant.

The compass magnetic azimuth is calculated from the two level components, $H_X$ and $H_Y$. In addition, the magnitude of the level component $H_L$ of the Earth's magnetic field is calculated as $$|H_L| = \sqrt{|H_X|^2 + |H_Y|^2}$$

which is the magnitude of the horizontal component regardless of how it may be partitioned between $H_X$ and $H_Y$, depending on the azimuth.

Because during normal compass operation the compass azimuth angle and the magnitude of $H_L$ are continuously calculated, the local vertical and horizontal components $H_G$ and $H_L$ of the Earth's magnetic field are also continuously calculated and available. These two values are available regardless of the orientation of the compass and represent the Earth's magnetic field at the time the compass is being used, regardless of whether the Earth's magnetic field is the same as when the compass was calibrated. The calculation of $H_G$ and $H_L$ is not depicted as a separate process because these values are byproducts of the calculation of the compass magnetic azimuth and do not involve additional calculations.

Figure 7:
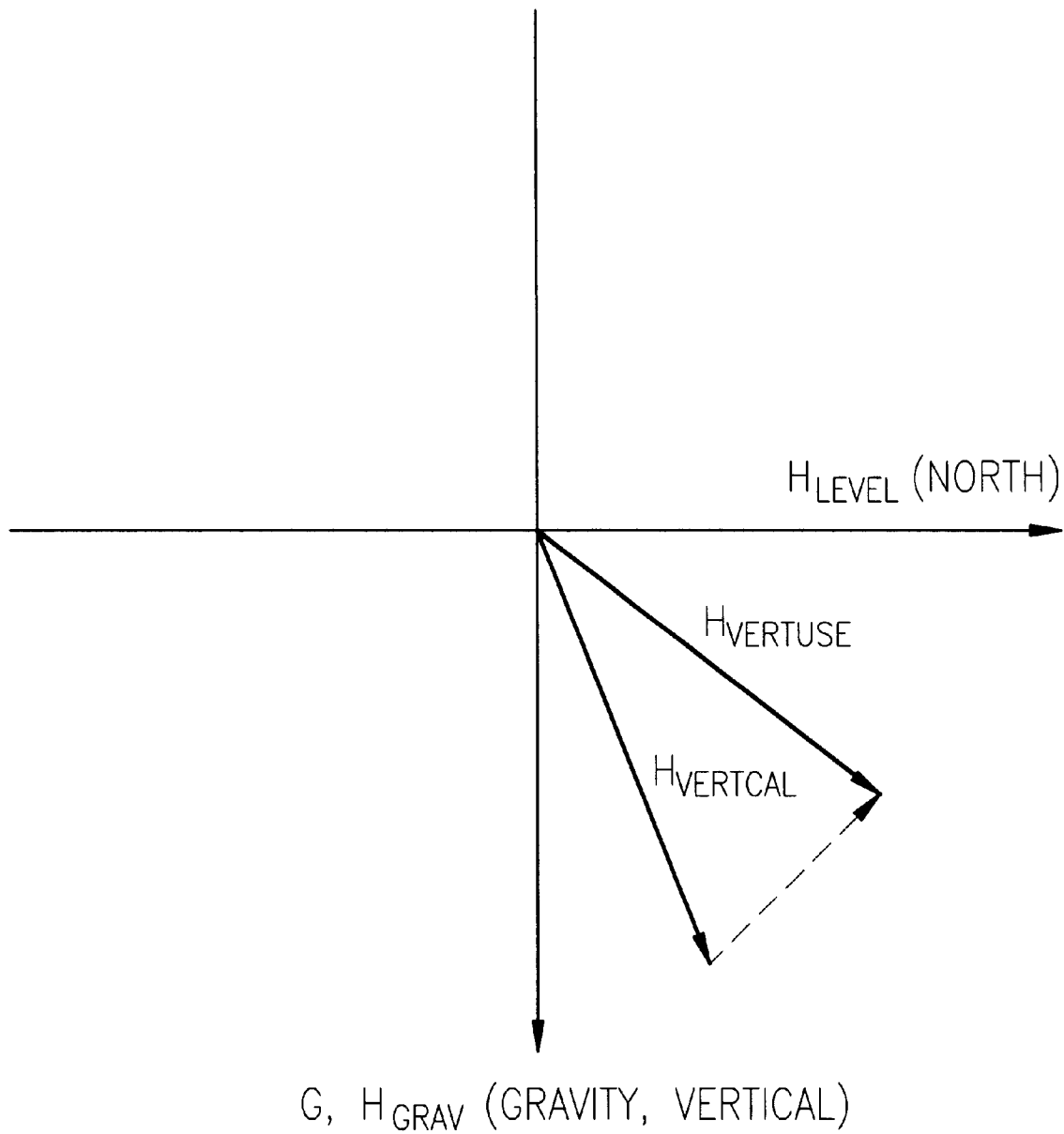
FIG. 7 conceptually depicts the magnetic vectors used in monitoring the accuracy of an electronic compass.

The values $H_G$ and $H_L$ together form the current value of the vector $H_{Vert}=[H_G, H_L]$ in the vertical plane. FIG. 7 depicts the geometry of the vertical plane and the vectors $H_{Vert}=[H_G, H_L]$. In FIG. 7, the value $H_{VertCal} \approx H_{EARTH}$ is the value of $H_{Vert}$ as calculated and stored as part of the calibration calculation. At a block 656 of FIG. 6B, the components of $H_{VertCal}$ are stored in the memory associated with the electronic compass.

In addition, during normal operation of the electronic compass, the magnetometer signals are continuously compensated and give accurate values for the Earth's magnetic field $H_{EARTH}$, which is expressed in the internal coordinate system of the arbitrarily-oriented compass. During the compensation process, the local vertical and horizontal components $H_G$ and $H_L$ of the Earth's magnetic field are continuously calculated and available. The values $H_G$ and $H_L$ form the current value of the vector $H_{Vert}=[H_G, H_L]$ in the vertical plane. To differentiate this vector from the vector $H_{VertCal}$, a distinct designation $H_{VertUse}$ is used. In FIG. 7, $H_{VertUse} \approx H_{EARTH}$ is the value continually calculated as the compass is in use. As discussed above in connection with FIG. 6A, the components of $H_{VertUse}$ are stored in the memory at block 608.

According to one aspect of the present invention, the accuracy of the compass is monitored during use by comparing the current value of $H_{Vert}$ with its value as stored from the most recent calibration, i.e., by comparing $H_{VertUse}$ with $H_{VertCal}$, at a block 610 of FIG. 6A. Ideally, these two values should be equal. A significant discrepancy between the current and stored values of $H_{Vert}$ is cause for suspicion that the compass azimuth has become inaccurate. In the scenario depicted in FIG. 7, the vector Q represents the difference between $H_{VertCal}$ and $H_{VertUse}$ and is a measure of probable compass error from any causes. The vector Q is used to estimate the accuracy of compensation.

As discussed more fully below, inaccuracies can result from a variety of causes. The present invention provides a method of detecting inaccurate azimuth readings regardless of the cause and also provides a quantitative measure, via Q, of the potential degree of inaccuracy.

In accordance with this aspect of the present invention, $H_{VertUse}$ and $H_{VertCal}$ can be compared using any of a variety of criteria to yield a quantitative measure of the accuracy of the compass. Because two component values are associated with each measurement, namely, $H_G$ and $H_L$, $H_{VertUse}$ and $H_{VertCal}$ can be compared either individually or as vectors. Throughout this disclosure, a scalar quantity Q (distinguished from the vector Q of FIG. 7, which appears in boldface) represents the difference between a calibration-value and a current-use value of a particular measure of accuracy, respectively denoted by the subscripted use of "Cal" or "Use." Thus, in one example embodiment, accuracy can be measured by the difference in vertical values, $H_G$:

$$Q_G = H_{GCal} - H_{GUse}$$

Similarly, accuracy can be measured by the difference in level values, $H_L$:

$$Q_L = H_{LCal} - H_{LUse}$$

Comparing the magnitudes of $H_{VertUse}$ and $H_{VertCal}$ can also indicate accuracy:

$$Q_H = |H_{VertCal}| - |H_{VertUse}|$$

Alternatively, accuracy can be expressed as the magnitude of the vector difference between $H_{VertUse}$ and $H_{VertCal}$:

$$Q_{Vert} = |H_{VertCal} - H_{VertUse}|$$

The angle between $H_{VertUse}$ and $H_{VertCal}$ can also be used as an indicator of azimuth accuracy:

$$Q_\angle = \angle H_{VertCal} - \angle H_{VertUse}$$

Any or all of these difference comparisons can be used, and the magnitude of the difference serves as a quantitative measure of the quality of the compass readings during use.

Of these, the $Q_{Vert}$ measure is particularly suited to monitor compass accuracy in environments in which magnetic anomalies or calibration changes can affect $H_{VertUse}$ in a variety of ways. Any magnetic anomaly or calibration change will produce a difference between $H_{VertUse}$ and $H_{VertCal}$ that can be detected using the measure:

$$Q_{Vert} = |H_{VertCal} - H_{VertUse}|$$

By contrast, the other measures might not detect potential inaccuracies in certain cases. For example, some changes might produce a difference in magnitude, but not angle, between $H_{VertUse}$ and $H_{VertCal}$. Other changes might produce a difference in angle, but not magnitude. Still other changes, for example, might produce a difference in the level component without producing a difference in the vertical component. These types of changes, which produce a difference in one or more characteristics of $H_{VertUse}$ and $H_{VertCal}$ but not in other characteristics, might not be detected by some measures of inaccuracy. Using $Q_{Vert}$, however, encompasses all possible differences between $H_{VertUse}$ and $H_{VertCal}$. Therefore, any changes that affect compass accuracy can be detected and monitored.

Regardless of which measure of compass accuracy is used, one or more threshold values of Q are used to warn the user of potential inaccuracy. In a particular embodiment, multiple thresholds are employed, e.g., 0<Q1<Q2<Q3 in the case of three thresholds. In this embodiment, a Q value between 0 and Q1 indicates that the azimuth is accurate as indicated. When Q is between Q1 and Q2, the azimuth is fairly accurate and still usable. A Q value between Q2 and Q3 indicates that accuracy is probably poor and that using the indicated azimuth might be risky. If Q is larger than Q3, the azimuth is considered unusable.

According to another specific embodiment, these threshold values are used in a system into which the compass is integrated, e.g., an aircraft navigation system. Rather than issuing a warning to the user, the system interprets the numerical values of Q and responds accordingly by, for example, recalibrating the compass as necessary.

The measure of compass accuracy Q can be analyzed using other techniques in addition to those described above. For example, the values of Q can be averaged over time using short-term averages, long-term averages, or both. In order to determine possible causes of compass inaccuracy, the use-time value $H_{VertUse}$ can be averaged over a relatively long time span, and the average value thus obtained can be compraed to the calibration-time stored value $H_{VertCal}$.

Several different causes of compass inaccuracy can be detected by comparing $H_{VertCal}$ and $H_{VertUse}$. For instance, changes in internal perturbing magnetic fields can cause the compensation coefficients to become incorrect, requiring recalibration of the compass. The internal perturbing magnetic fields can change if the equipment on which the compass is mounted becomes remagnetized or physically shifts. Changing the mounting position or orientation of the compass with respect to the equipment on which it is mounted can also change the internal perturbing magnetic fields. These changes are usually semi-permanent, making recalibration of the compass particularly important. Thus, detecting these changes is also extremely important.

Another cause of compass inaccuracy that can be detected by comparing $H_{VertCal}$ and $H_{VertUse}$ is magnetic perturbations introduced by entering regions of external magnetic anomalies. When such a region is entered, the total magnetic field sensed by the compass will differ from that sensed when the compass was calibrated. It is highly desirable to detect entry into regions of external magnetic anomalies, but recalibration is probably not required because the inaccurate azimuth condition is often temporary. In particular, if the user moves away from the anomaly, the azimuth readings will once again be reliable, and the accuracy monitoring process will so indicate.

Changes in magnetic latitude, which cause the magnitude and direction of the Earth's magnetic field to change, can also be detected. Any of the measures of Q described above will detect changes in latitude, though the compensation and azimuth will still be correct. While this type of warning may be a false warning in the sense that the compensation and azimuth are still correct, the user is nevertheless warned that conditions have changed. Distinguishing between changes in magnetic latitude and local temporary magnetic anomalies is difficult. Comparisons can be made over a range of nearby locations, however, to determine whether the new magnetic field conditions are uniform over the area, suggesting a change in latitude rather than a local temporary magnetic anomaly.

Still another source of inaccuracy that can be detected is unsteady holding of the compass or other lateral accelerations. Lateral acceleration of the compass, whether hand held or mounted on other equipment, will produce an incorrect value for the gravity vector and, therefore, incorrect calculation of the magnetic azimuth in the horizontal plane. The magnetic azimuth will be calculated incorrectly because the horizontal plane as determined from the incorrect gravity vector will differ from the true horizontal plane. Accordingly, it is highly desirable to detect lateral acceleration of the compass. Because compensation does not depend on the gravity vector, it will be correct even in the presence of lateral accelerations. Incorrect values of the gravity vector due to lateral accelerations, however, will cause incorrect interpretation of the local level and vertical directions and incorrect values for $H_{VertUse}$ and the azimuth. Any of the measures of Q described above will detect lateral accelerations.

According to another embodiment of the present invention, the accuracy of the compass can be monitored without knowledge of $H_{VertCal}$. Monitoring compass accuracy in this manner involves obtaining knowledge of the normal $H_{Vert}$ during normal compass use, e.g., determining average values of $H_{VertUse}$ over time.

Figure 8:
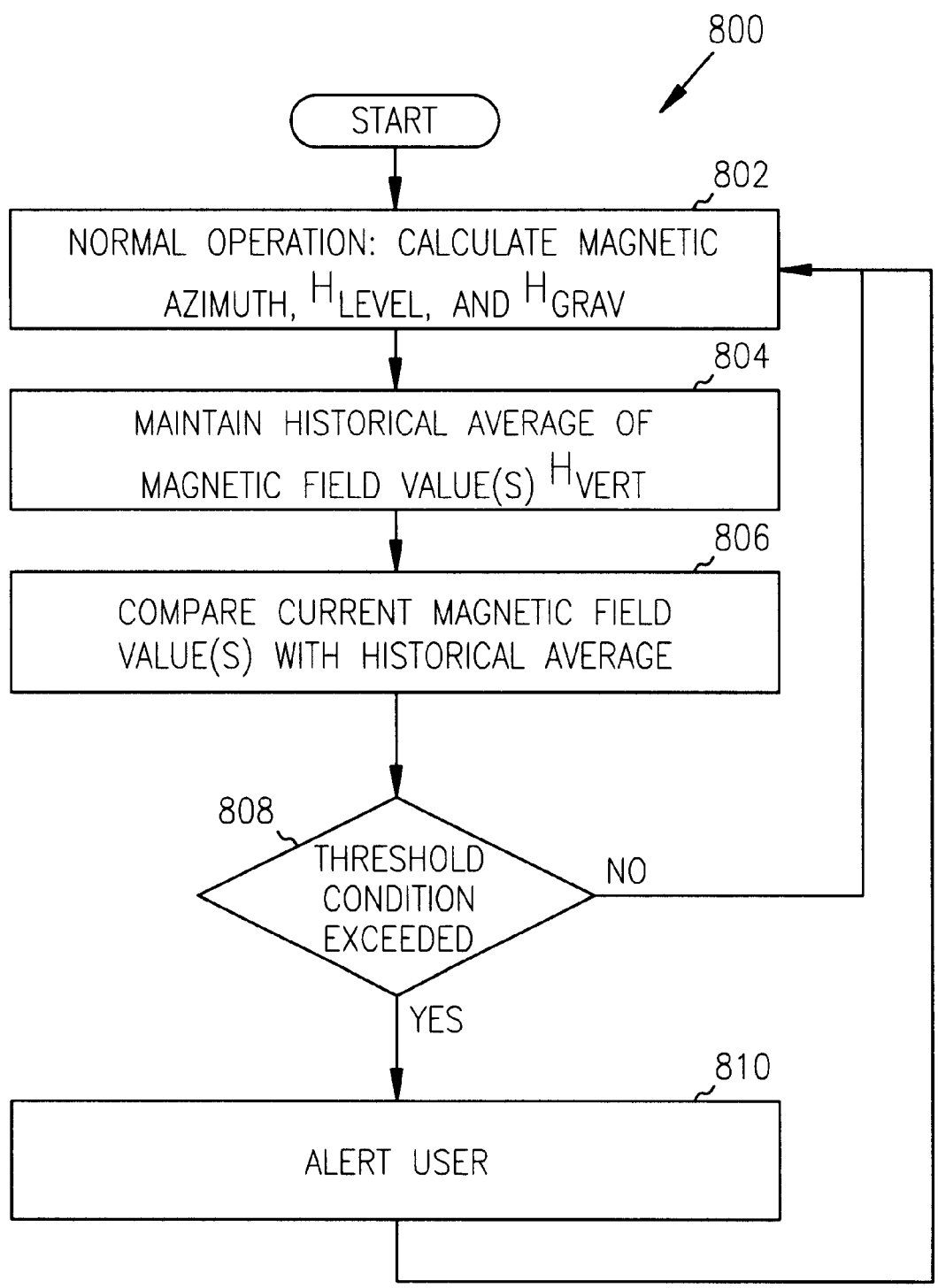
FIG. 8 depicts an example method for monitoring the accuracy of an electronic compass, according to a particular embodiment of the present invention.

FIG. 8 depicts an example method 800 for monitoring the accuracy of an electronic compass, according to this embodiment of the present invention. At a block 802, the magnetic azimuth of the compass is calculated during its normal operation. The values $H_G$ and $H_L$ and the vector $H_{Vert}$ are obtained as described above in connection with block 606 of FIG. 6.

Next, at a block 804, an historical average of these quantities is maintained. If the compass compensation is correct, these averages should be stable over all orientations of the compass, as they represent the constant value of the Earth's magnetic field in the area in which the compass is being used. Because the gravity vector G and the Earth's magnetic field vector $H_{EARTH}$ both change as the orientation of the compass changes, their average values are of little consequence. The relationship between G and $H_{EARTH}$, however, should be constant. This relationship is completely encompassed in the value of $H_{Vert}$, which is obtained by rotating $H_{EARTH}$ into the local level coordinates.

Any of the following quantities can be used to monitor azimuth accuracy without knowledge of $H_{VertCal}$:

$$AvgH_{Vert} = \text{Average}(H_{Vert})$$

$$AvgH_G = \text{Average}(H_G)$$

$$AvgH_L = \text{Average}(H_L)$$

These average values are calculated over time, e.g., over periods of minutes, or hours. Particular averaging periods can be especially advantageous under certain conditions or types of monitoring. For example, a surveyor or navigating vehicle operating in a local environment would probably use averaging only over hours or a day. By contrast, a fast missile system might use averaging over minutes.

Any of the average values defined above can be used in place of the corresponding calibration value in calculating the Q values previously discussed. For example, if $H_{GCal}$, the calibration value of $H_G$, is unknown, accuracy can be measured by the difference in vertical values between the current value and the average value:

$$Q_{GAvg} = (AvgH_G - H_{GUse})$$

Similarly, the average value $AvgH_L$ of the level value can be used to measure accuracy:

$$Q_{LAvg} = (AvgH_L - H_{LUse})$$

Comparing the magnitudes of $H_{VertUse}$ and $AvgH_{Vert}$ can also define accuracy:

$$Q_{HAvg} = |AvgH_{Vert}| - |H_{VertUse}|$$

Alternatively, accuracy can be expressed as the magnitude of the vector difference between $H_{VertUse}$ and $AvgH_{Vert}$:

$$Q_{AngleAvg} = |AvgH_{Vert} - H_{VertUse}|$$

The angle between $H_{VertUse}$ and $AvgH_{Vert}$ can also be used as an indicator of azimuth accuracy:

$$Q_{AngleAvg} = \angle AvgH_{Vert} - \angle H_{VertUse}$$

At a block 806, the current value of $H_{vert}$, namely, $H_{VertUse}$, is compared with a historical value using any of the above criteria for comparison. If a threshold condition is exceeded at a decision block 808, the user is alerted to the possible inaccuracy of the compass at a block 810. The user may then optionally recalibrate the compass or take other action, such as moving away from the area. If the threshold condition is not exceeded, or after the user takes appropriate action, flow returns to block 802, where the current magnetic azimuth is repeatedly calculated.

Average values and calibration values can be used independently or in combination. Using one type instead of the other is advantageous under certain circumstances. For example, using average values allows for changes in magnetic latitude because the average values will eventually adapt to reflect the new latitude, and accuracy monitoring will not be limited to comparison with values fixed at calibration time.

The various embodiments described above are provided by way of illustration only and should not be construed to limit the invention. Those skilled in the art will readily recognize various modifications and changes that can be made to these embodiments without strictly following the example embodiments and applications illustrated and described herein, and without departing from the true spirit and scope of the present invention, which is set forth in the following claims.

What is claimed is:

1. A method of monitoring the accuracy of an electronic compass, the method comprising:
   during a calibration operation of the electronic compass, calculating a plurality of compensation coefficient values using a technique that also yields a first set of two magnetic field values that characterize the magnetic field of the Earth during the calibration operation;
   during a normal operation of the electronic compass, calculating subsequent compass magnetic azimuth values that yield a second set of two magnetic field values that characterize the magnetic field of the Earth during the normal operation;
   comparing at least one of the first magnetic field values with at least one of the second magnetic field values;
   comparing a first vector derived from the first magnetic field values with a second vector derived from the second magnetic field values; and
   comparing a magnitude of a vector difference between the first and second vectors with a threshold magnitude to determine the accuracy of the compass.

2. The method of claim 1, wherein the first set of two magnetic field values and the second set of two magnetic field values both characterize the magnetic field of the Earth in a vertical plane.

3. The method of claim 1, further comprising comparing a vertical component of the Earth's magnetic field calculated during the calibration operation with a vertical component of the Earth's magnetic field calculated during the normal operation.

4. The method of claim 1, further comprising comparing a level component of the Earth's magnetic field calculated during the calibration operation with a level component of the Earth's magnetic field calculated during the normal operation.

5. The method of claim 1, further comprising comparing a magnitude of the first vector a magnitude of the second vector.

6. The method of claim 1, further comprising comparing an angle of the first vector with an angle of the second vector.

7. The method of claim 1, further comprising comparing at least one of the first magnetic field values with at least one of the second magnetic field values with reference to a plurality of threshold values.

8. The method of claim 7, further comprising alerting a user of the electronic compass in response to a difference between the compared magnetic field values exceeding one of the threshold values.

9. The method of claim 8, further comprising selecting an alert to be conveyed to the user as a function of which one of the plurality of threshold values is exceeded by the difference between the compared magnetic field values.

10. A method of monitoring the accuracy of an electronic compass, the method comprising:
    during operation of the electronic compass, calculating a compass magnetic azimuth using a technique that also yields a plurality of magnetic field values that characterize the magnetic field of the Earth during the compass operation;
    maintaining a historical average of the magnetic field values;
    comparing at least one of the magnetic field values with the historical average;
    comparing a first vector derived from the magnetic field values with a second vector derived from the historical average; and
    comparing a magnitude of a vector difference between the first and second vectors with a threshold magnitude to determine the accuracy of the compass.

11. The method of claim 10, wherein the plurality of magnetic field values characterize the magnetic field of the Earth in a vertical plane.

12. The method of claim 10, further comprising comparing a vertical component of the Earth's magnetic field calculated during the operation of the electronic compass with a historical average of the vertical component of the Earth's magnetic field maintained during the normal operation.

13. The method of claim 10, further comprising comparing a level component of the Earth's magnetic field calculated during the operation of the electronic compass with a historical average of the level component of the Earth's magnetic field maintained during the normal operation.

14. The method of claim 10, further comprising comparing a magnitude of the first vector with a magnitude of the second vector.

15. The method of claim 10, further comprising comparing an angle of the first vector with an angle of the second vector.

16. The method of claim 10, further comprising comparing at least one of the magnetic field values with the historical average with reference to a plurality of threshold values.

17. The method of claim 16, further comprising alerting a user of the electronic compass in response to a difference between the compared magnetic field values and the historical average exceeding one of the threshold values.

18. The method of claim 17, further comprising selecting an alert to be conveyed to the user as a function of which one of the plurality of threshold values is exceeded by the difference between the compared magnetic field values and the historical average.

* * * * *

UNITED STATES PATENT AND TRADEMARK OFFICE
CERTIFICATE OF CORRECTION

PATENT NO. : 6,539,639 B2
DATED : April 1, 2003
INVENTOR(S) : Robert B. Smith

It is certified that error appears in the above-identified patent and that said Letters Patent is hereby corrected as shown below:

<u>Title page,</u>
Item [74], delete "," after "International".

<u>Column 5,</u>
Line 2, delete "$H_{EARTH}>+h_2<k_2<e_2$." and insert -- $H_{EARTH}>+h_2>k_2<e_2$. --

<u>Column 10,</u>
Line 45, delete "$Q_{Vert} = |H_{VertCal} - |H_{VertUse}|$" and insert -- $Q_{Vert} = |H_{VertCal} - H_{VertUse}|$ -- therefor.

Signed and Sealed this

Twenty-third Day of December, 2003

JAMES E. ROGAN
*Director of the United States Patent and Trademark Office*